(12) United States Patent
Hosoya

(10) Patent No.: US 6,978,667 B2
(45) Date of Patent: Dec. 27, 2005

(54) INTAKE AIR AMOUNT DETECTING APPARATUS FOR ENGINE AND METHOD THEREOF

(75) Inventor: Hajime Hosoya, Atsugi (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/770,547

(22) Filed: Feb. 4, 2004

(65) Prior Publication Data

US 2004/0154387 A1    Aug. 12, 2004

(30) Foreign Application Priority Data

Feb. 4, 2003   (JP)   .............................. 2003-026974
Feb. 4, 2003   (JP)   .............................. 2003-026975

(51) Int. Cl.⁷ .......................................... G01M 15/00
(52) U.S. Cl. ................................... 73/118.2
(58) Field of Search ............................. 73/118.2, 116, 73/117.2, 117.3, 118.1; 701/29

(56) References Cited

U.S. PATENT DOCUMENTS

| | | | |
|---|---|---|---|
| 5,817,932 A * | 10/1998 | Nishimura et al. | 73/118.2 |
| 5,832,403 A * | 11/1998 | Kowatari et al. | 701/103 |
| 5,892,146 A * | 4/1999 | Kobayashi et al. | 73/118.2 |
| 5,918,582 A * | 7/1999 | Itoyama et al. | 123/568.29 |
| 6,334,083 B1 * | 12/2001 | Aono et al. | 701/102 |
| 6,672,146 B1 * | 1/2004 | Kobayashi et al. | 73/118.2 |
| 6,839,643 B2 * | 1/2005 | Kanke et al. | 702/45 |

FOREIGN PATENT DOCUMENTS

JP    11-182318 A    7/1999

* cited by examiner

*Primary Examiner*—Eric S. McCall
(74) *Attorney, Agent, or Firm*—Foley & Lardner LLP

(57) ABSTRACT

Detection signals from an airflow meter, which outputs different detection signals for the forward flow and reverse flow of the intake air of an engine, are converted into intake air amount data of the same sign. An offset amount is subtracted from the intake air amount data obtained by the conversion process, thereby obtaining intake air amount data in which the forward flow and the reverse flow are distinguished from each other by positive and negative signs.

18 Claims, 5 Drawing Sheets

INTAKE AIR AMOUNT DETECTING APPARATUS FOR ENGINE AND METHOD THEREOF

FIELD OF THE INVENTION

BACKGROUND

The present invention relates to an intake air amount detecting apparatus (and a method thereof) for detecting an intake air amount of an engine by distinguishing between the forward flow and the reverse flow.

Japanese Unexamined Patent Publication No. 11-182318 discloses an airflow meter that outputs a voltage 1V in a state in which an intake air amount is 0, outputs a voltage higher than 1V as an air amount in a forward direction is increased, and outputs a voltage lower than 1V as an air amount in a reverse direction is increased.

In the case in which a cylinder intake air amount is obtained using the airflow meter, it is necessary to distinguish between the forward flow and the reverse flow. A method of distinguishing between the forward flow and the reverse flow includes the steps of (a) indicating, for example, the forward flow by a positive sign and the reverse flow by a negative sign; and (b) converting, in a conversion table, the output voltage from the airflow meter into intake air amount data.

In the above conversion table, half of an expressible numeric range is used for expressing the air amount on the negative sign side. However, there is caused a problem in that, as the range of change in flow amount on the reverse flow side is narrower than that on the forward flow side, a conversion table capable of expressing a large reverse amount, which is never actually generated, lowers the resolution for intake air amount detection.

As a result, if the number of bits in the intake air amount data is increased, it becomes possible to ensure the necessary resolution. However, this solution heavily consumes memory capacity.

SUMMARY

The present invention has an object to enable, with high resolution, a detection of an intake air amount, the forward flow and the reverse flow of which are distinguished from each other, while suppressing the number of bits in intake air amount data.

To achieve the above object, the present invention is constituted so that detection signals from an intake air amount detector, which outputs different detection signals for the forward flow and reverse flow of engine intake air, are converted into intake air amount data of same sign. An offset amount is subtracted from the intake air amount data obtained by the conversion process, thereby obtaining intake air amount data in which the forward flow and the reverse flow are distinguished from each other by signs.

The other objects and features of the present invention will become apparent from the following description with reference to the accompanying drawings.

DETAILED DESCRIPTION

Figure 1:
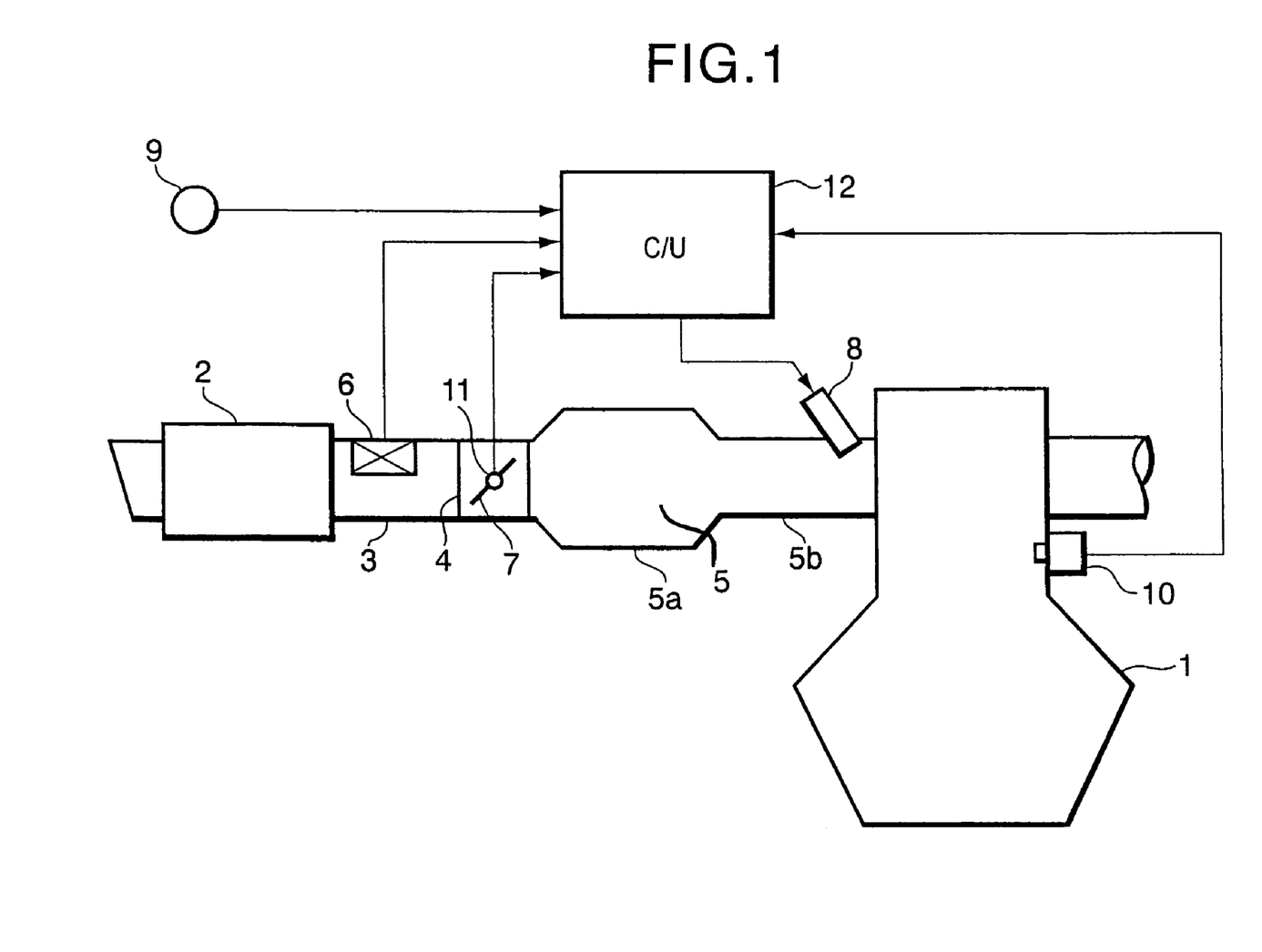
FIG. 1 is a system configuration of an engine in an embodiment of the present invention.

FIG. 1 shows an engine in an embodiment of the present invention along with a control system. In FIG. 1, air is sucked into an engine 1 via an air cleaner 2, an intake duct 3, a throttle chamber 4 and an intake manifold 5.

An airflow meter 6 is disposed in the intake duct 3. The airflow meter 6 outputs different detection signals for the forward flow and the reverse flow, thereby detecting an intake air amount Q as the mass flow.

Figure 2:
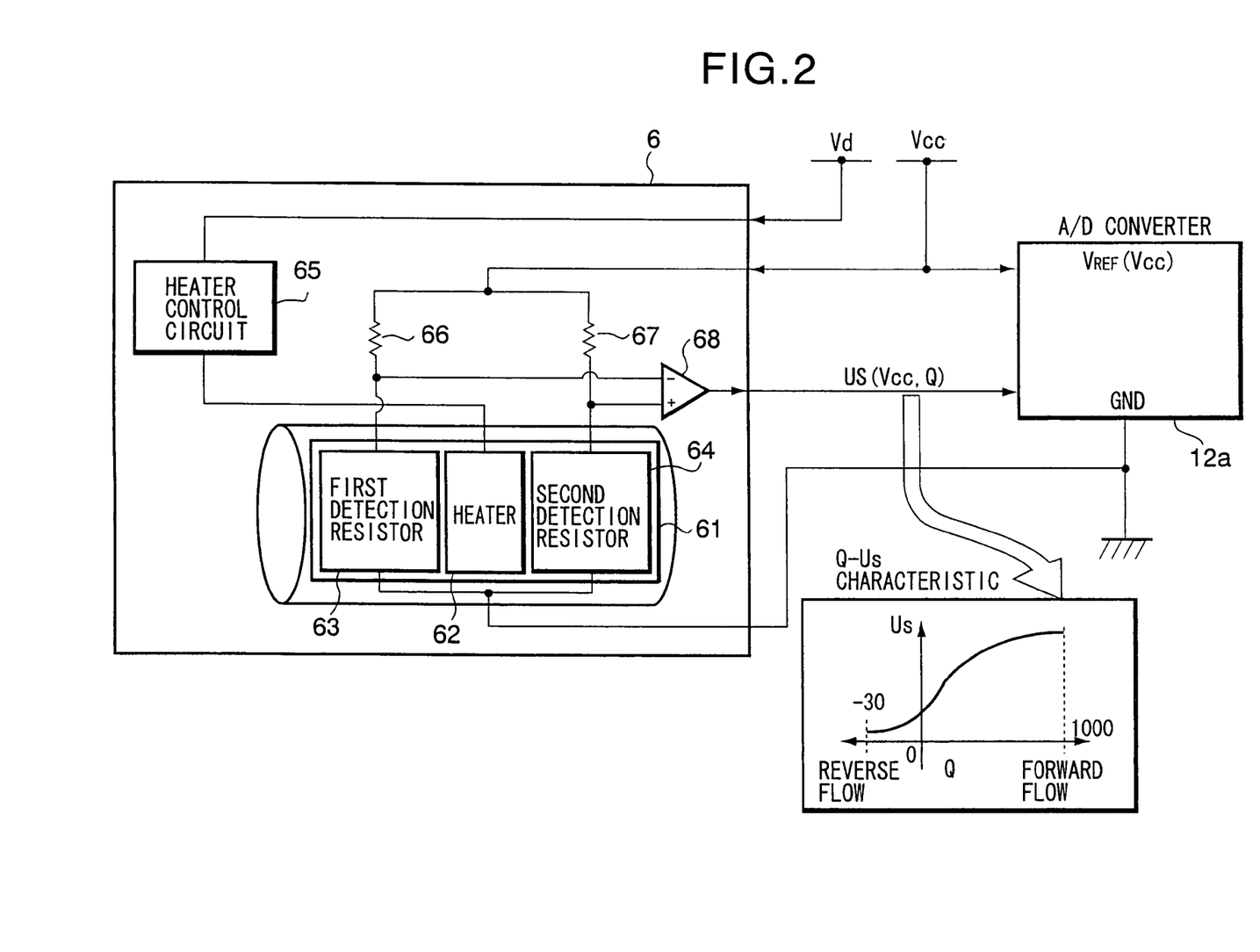
FIG. 2 is a circuit diagram of an airflow meter in the embodiment shown in FIG. 1.

FIG. 2 shows a circuit structure of the airflow meter 6. In FIG. 2, on a substrate 61 that is provided in intake duct 3, a first detection resistor 63 and a second detection resistor 64 are disposed with a heater 62 therebetween. The first detection resistor 63 is disposed upstream of the heater 62, whereas the second detection resistor 64 is disposed downstream of the heater 62. A heater control circuit 65 controls the power supply to the heater 62.

Each of the first and second detection resistors 63 and 64 has a characteristic in which a resistance value thereof is changed depending on a temperature. The first and second detection resistors 63 and 64 are connected to first and second fixed resistors 66 and 67, respectively, to form a bridge circuit. The potential at the connection point of the first detection resistor 63 and the first fixed resistor 66 and the potential at the connection point of the second resistor 64 and the second fixed resistor 67 are input to a negative terminal and a positive terminal of an amplifier 68, respectively.

An output voltage Us of the amplifier 68 is output, as a detection signal of the airflow meter 6, to an A/D converter 12a, in which the output voltage Us is converted into a digital value. Here, the output voltage Us from the amplifier 68 is set to be 1V in a state in which the intake air amount is 0.

When intake air flows in a forward direction, the first detection resistor 63 is not heated as it is located upstream of the heater 62. On the contrary, the second detection resistor 64 is heated as it is located downstream of the heater 62. As a result, a difference in temperature is generated between the first and second detection resistors 63 and 64. Further, as the intake air amount is increased, a quantity of heat received by the second detection resistor 64, via the intake air, is increased and, therefore, the difference in temperature between the second detection resistor 64 and the first detection resistance 63 becomes large. Then, a difference in resistance value between the first detection resistor 63 and the second detection resistor 64 becomes large depending on the temperature difference. As a result, a difference in potential input to the amplifier 68 becomes large, and further the output voltage Us of the amplifier 68 is increased as the intake air amount in the forward flow is increased.

On the other hand, when the intake air flows in a reverse direction, the first detection resistor 63 is heated, thereby causing the difference in temperature and the difference in resistance value to be the opposite of those of when the intake air flows in the forward direction. Thus, when the intake air flows in the reverse direction, the output voltage Us is reduced as compared with that in the state in which the intake air amount is 0. Consequently, an output voltage Us (V) of the airflow meter 6 exhibits an output characteristic as shown in FIG. 2. Namely, the airflow meter 6 outputs the detection signal for the forward flow when the output voltage thereof is larger than 1(V), and outputs the detection signal for the reverse flow when the output voltage there is smaller than 1(V).

A throttle valve 7 is disposed in the throttle chamber 4. The intake manifold 5 includes a collector portion 5a that is downstream of the throttle valve 7, and a branch portion 5b that is branched for each cylinder on the further downstream side. The branch portion 5b is provided with a fuel injection valve 8. The fuel injection valve 8, which is supplied with fuel pumped from a fuel pump, (a) adjusts the fuel to at a predetermined pressure by a pressure regulator, and (b) injects the fuel in an amount proportional to valve opening period.

Further, there are provided a crank angle sensor 9 that detects a crank angle, a water temperature sensor 10 that detects a cooling water temperature of the engine 1, and a throttle sensor 11 that detects an opening of the throttle valve 7. Detection signals from these sensors are input to a control unit 12, which incorporates a microcomputer and A/D converter 12a therein. The control unit 12 calculates an engine rotation speed Ne based on the detection signal from the crank angle sensor 9. Further, the control unit 12 determines the intake air amount Q based on the output voltage Us from the airflow meter 6, to perform a fuel injection control and an ignition control based on the engine rotation speed Ne and the intake air amount Q.

Here, a first embodiment of a detecting process of the intake air amount Q will be described in accordance with a flowchart of FIG. 3.

In step S1, the output voltage Us from the airflow meter 6 is read in.

In next step S2, as shown in the figure, the output voltage Us is converted into data of intake air amount Q, using a conversion table that converts all the output voltages Us into positive intake air amount data. The conversion table is for shifting the output characteristic of the airflow meter 6, which is shown in a dotted line, to the forward flow side by an absolute value of a maximum flow amount Qg on the reverse flow side (in the present embodiment, Qg=−30 kg/h), to convert all the output voltages Us into positive intake air amounts Q.

In step S3, an offset amount stored in advance is read out. The offset amount is the amount obtained by shifting the output characteristic of the airflow meter 6 in the setting of the conversion table, and is stored in advance as 30 kg/h in the present embodiment.

In step S4, the offset amount is subtracted from the intake air amount Q obtained using the converting table in step S2, to obtain the intake air amount Q the forward flow and the reverse flow of which are distinguished from each other by the positive and negative signs.

Further, in step S5, the intake air amount Q obtained in step S4 is weight-averaged to be given with a phase delay of a portion of a filling delay to the intake manifold 5, thereby obtaining a cylinder intake air amount. The cylinder intake air amount is used for the calculation of fuel injection quantity and the calculation of ignition timing.

In the above conversion table, the output voltage Us at the time of the maximum flow amount Qg on the reverse flow side is converted into the intake air amount=0, and the output voltage Us at the time of the maximum flow amount on the forward flow side is converted into a maximum intake air amount. Therefore, the entire range of intake air amount data is used for expressing the intake air amount capable of being actually generated. Consequently, compared with the case in which the output voltage Us is converted into the intake air amount, the forward flow and the reverse flow of which are indicated by the positive and negative signs, it is possible to detect, with high resolution, the intake air amount Q based on the output voltage Us, without increasing the number of bits in the data of intake air amount Q. Further, after the conversion process using the conversion table, the offset amount is subtracted from the data of intake air amount Q. Thus, it becomes possible to distinguish between the forward flow and the reverse flow based on the positive and negative signs of the intake air amount Q after the subtraction.

Figure 3:
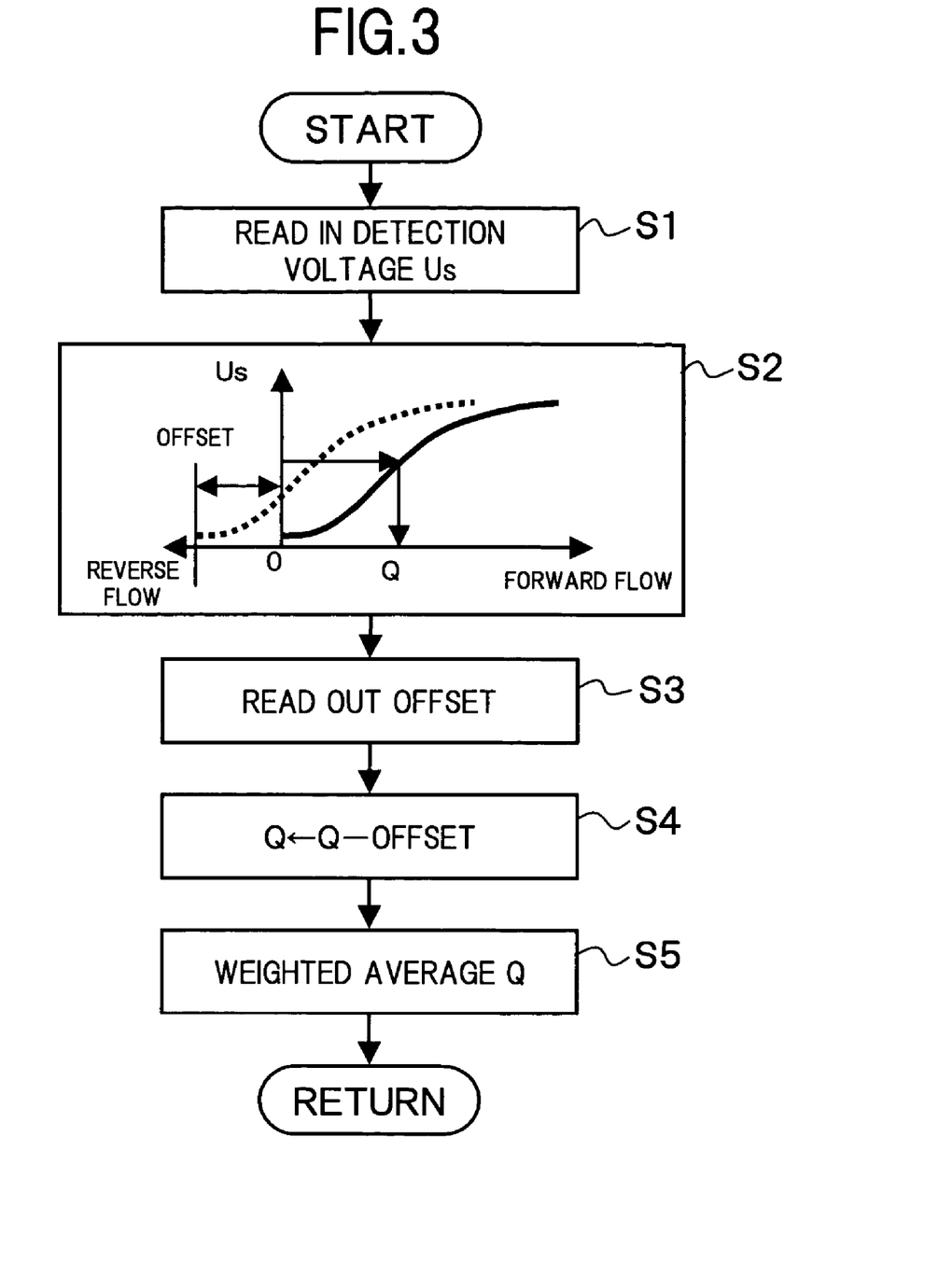
FIG. 3 is a flowchart that shows a first embodiment of a detecting process of an intake air amount.

In the embodiment shown in the flowchart of FIG. 3, the offset amount is stored in advance. However, the similar offset correction can be performed by storing the output voltage Us output by the airflow meter 6 when the intake air amount=0. A second embodiment having such a constitution will be described in accordance with a flowchart of FIG. 4.

Figure 4:
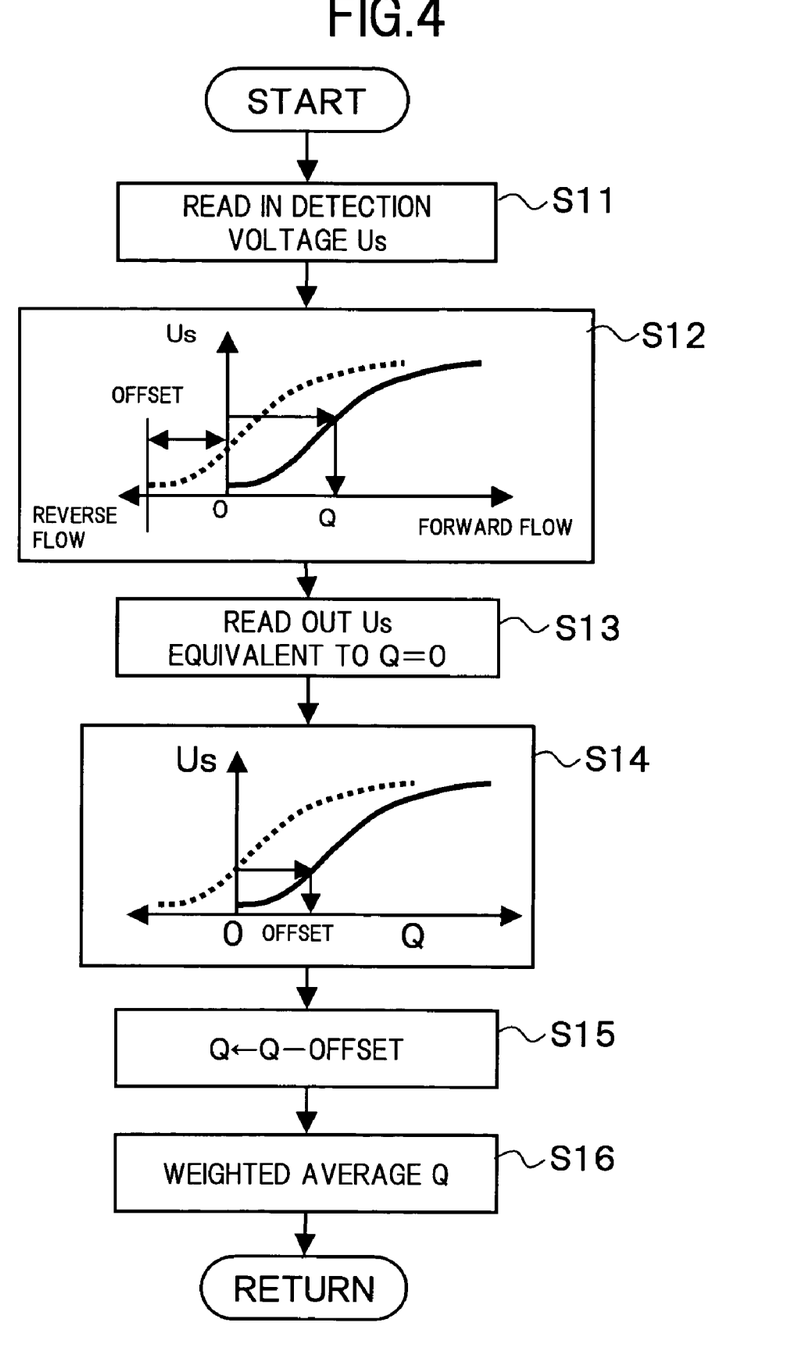
FIG. 4 is a flowchart that shows a second embodiment of a detecting process of an intake air amount.

In step S11, the output voltage Us from the airflow meter 6 is read in.

In step S12, in the same manner as in step S2, the output voltage Us is converted into the data of intake air amount Q, using the conversion table that converts all the output voltages Us into the positive intake air amount data.

In step S13, the output voltage Us, stored in advance, of when the intake air amount=0 is read out.

Then, in step S14, the output voltage Us of when the intake air amount=0 is converted into the intake air amount using the conversion table, and the intake air amount obtained by the conversion process is set to the offset amount. Namely, the intake air amount, which is obtained by converting the output voltage Us of when the intake air amount=0 using the conversion table, is equivalent to a shift amount for obtaining the conversion table based on the output characteristic of the airflow meter 6. Accordingly, if the shift amount is made to be the offset amount, it is possible to obtain the intake air amount data by distinguishing between the forward flow and reverse flow using the positive and negative signs.

In step S15, the offset amount obtained in step S14 is subtracted from the intake air amount Q obtained using the conversion table in step S12, thereby obtaining the intake air amount Q, the forward flow and the reverse flow of which are distinguished by the positive and negative signs.

Further, in step S16, the intake air amount Q obtained in step S15 is weight-averaged to be given with a phase delay of a portion of a filling delay to the intake manifold 5, thereby obtaining the cylinder intake air amount.

Note, the constitution of the airflow meter 6 is not limited to the one shown in FIG. 2. Other such constitutions can also be applicable, provided that the output voltage for the forward flow is output on one side and the output voltage for the reverse flow is output on the other side, with the output voltage of when the intake air amount of the engine 1 is 0 as a boundary.

Figure 5:
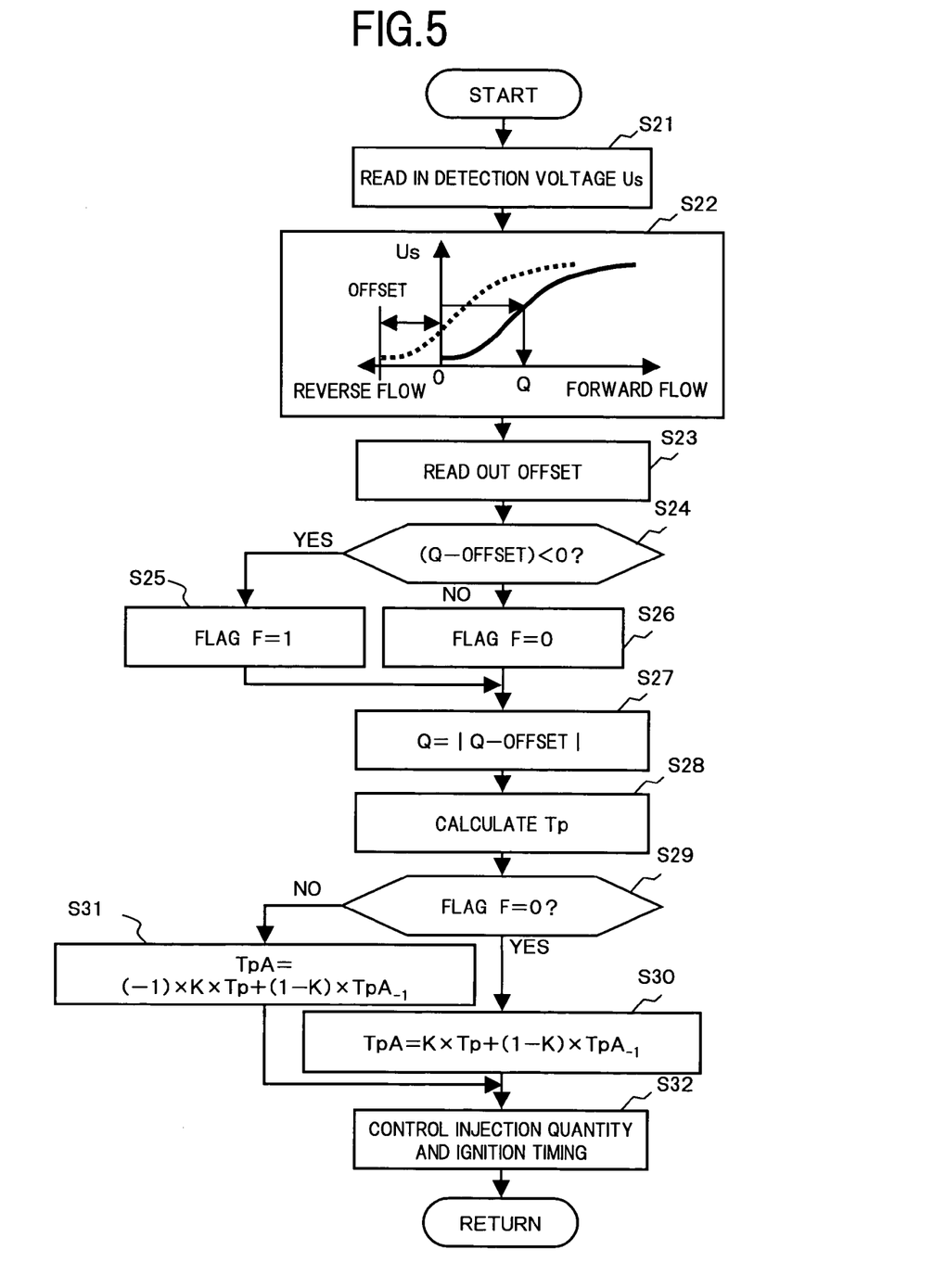
FIG. 5 is a flowchart that shows a third embodiment of a detecting process of an intake air amount.

Next, a third embodiment of a detecting process of the intake air amount will be described in accordance with a flowchart of FIG. 5.

In step S21, the output voltage Us from the airflow meter 6 is read in.

In next step S22, in the same manner as in step S2 and step S12, the output voltage Us is converted into the data of intake air amount Q, using the conversion table that converts all the output voltages Us into the positive intake air amount data.

In step S23, in the same manner as in step S3, the offset amount stored in advance is read out.

In step S24, it is judged whether or not the result obtained by subtracting the offset amount from the intake air amount Q obtained using the conversion table in step S22 is smaller than 0. If the result obtained by subtracting the offset amount from the intake air amount Q obtained using the conversion table in step S22 is smaller than 0, control proceeds to step S25, in which a flag F is set to 1. On the other hand, if the result obtained by subtracting the offset amount from the intake air amount Q obtained using the conversion table in step S22 is 0 or above, then control proceeds to step S26, in which the flag F is set to 0. If the flag F is 1, it is indicated that the airflow at the time is in the reverse direction. In contrast, if the flag F is 0, it is indicated that the airflow at the time is in the forward direction.

In step S27, an absolute value of the result obtained by subtracting the offset amount from the intake air amount Q obtained using the conversion table in step S22 is calculated. For the result obtained by subtracting the offset amount from the intake air amount Q obtained using the conversion table in step S22, if the result is negative, the airflow in the reverse direction is indicated, whereas if the result is positive, the airflow in the forward direction is indicated. However, by obtaining the absolute value, there is no distinction between the forward flow and the reverse flow.

In step S28, a basic fuel injection quantity Tp, which is equivalent to an inner-cylinder air amount, is calculated based on the absolute value of the intake air amount Q obtained in step S27 and the engine rotation speed Ne in accordance with the following equation:

$Tp=C \times Q/Ne$ ($C$ is a constant)

In step S29, it is judged whether the flag F is 0 or not.

Then, at the time of forward flow where the flag F is 0, control proceeds to step S30, where a weighted mean value TpA of the basic fuel injection quantity Tp is calculated in accordance with the following equation:

$TpA = K \times Tp + (1-K) \times TpA_{-1}$

Note: (a) K is a constant of 0<K<1, (b) Tp is a newest basic fuel injection quantity, and (c) $TpA_{-1}$ is a previous weighted mean value.

On the other hand, at the time of reverse flow where the flag F is 1, control proceeds to step S31, where the weighted mean value TpA of the basic fuel injection quantity Tp is calculated in accordance with the following equation:

$TpA = (-1) \times K \times Tp + (1-K) \times TpA_{-1}$

The basic fuel injection quantity Tp is weight-averaged to be given with the phase delay corresponding to the filling delay to the intake manifold. Here, at the time of reverse flow, the calculation is switched to that for multiplying −1 on the newest basic fuel injection quantity Tp, so that the weighted mean value TpA is corrected to the negative side. Thus, even if all the data of intake air amount Q is made to have positive values irrespective of the forward flow or the reverse flow, it is possible to perform the weight-averaging calculation by distinguishing between the forward flow and the reverse flow, thereby obtaining a cylinder intake air equivalent amount with high accuracy.

In step S32, the fuel injection quantity and the ignition timing are controlled based on the weighted mean value TpA.

In the above embodiment, the basic fuel injection quantity Tp is weight-averaged. However, the constitution may be such that the weight-averaging calculation of the intake air amount Q (absolute value) obtained in step S27 is performed by switching the calculating equations based on the flag F, and thereafter, the basic fuel injection quantity Q is calculated based on the weighted mean value of the intake air amount.

The entire contents of Japanese Patent Applications No. 2003-026974 filed Feb. 4, 2003 and No. 2003-026975 filed Feb. 4, 2003, priorities of which are claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and not for the purpose of limiting the invention as defined in the appended claims and their equivalents.

What is claimed are:

1. An intake air amount detecting apparatus for an engine, comprising:
    an intake air amount detector that is configured to output different detection signals for the forward flow and reverse flow of engine intake air;
    a conversion section that is configured to convert each of the detection signals from said intake air amount detector into intake air amount data of same sign;
    an offset-amount setting section that is configured to set an offset amount for converting the intake air amount data obtained in said conversion section into intake air amount data with signs that distinguish between the forward flow and the reverse flow; and
    a subtracting section that is configured to subtract the offset amount set by the offset-amount setting section from the intake air amount data obtained in said conversion section, to obtain intake air amount data in which the forward flow and the reverse flow are distinguished from each other by signs.

2. An intake air amount detecting apparatus for an engine according to claim 1, wherein said offset-amount setting section comprises:
    a storing section that stores said offset amount in advance as a constant.

3. An intake air amount detecting apparatus for an engine according to claim 1, wherein said offset-amount setting section comprises:
    a storing section that stores said detection signal that occurs when the intake air amount is 0; and
    a setting section that sets the intake air amount data obtained from said conversion section by converting the detection signal stored in said storing section, as said offset amount.

4. An intake air amount detecting apparatus for an engine according to claim 1, further comprising:
    a smoothing section that averages the intake air amount data obtained in said subtracting section.

5. An intake air amount detecting apparatus for an engine according to claim 1, further comprising:
    a flag setting section that sets a flag based on the sign of intake air amount data obtained in said subtracting section;
    a first calculating section that calculates an absolute value of the intake air amount data obtained in said subtracting section; and a smoothing section that averages the absolute value of the intake air amount data obtained in said first calculating section, based on calculating equations switched based on said flag.

6. An intake air amount detecting apparatus for an engine according to claim 5, wherein said smoothing section:
has a constitution to weight-average a newest value of said intake air amount data and a previous weighted mean value;
comprises a calculating equation for weight-averaging said newest value as a negative value and a calculating equation for weight-averaging said newest value as a positive value;
selects the calculating equation for weight-averaging said newest value as the negative value when it is judged based on said flag that the intake air is in the reverse flow; and
selects the calculating equation for weight-averaging said newest value as the positive value when it is judged based on said flag that the intake air is in the forward flow.

7. An intake air amount detecting apparatus for an engine according to claim 1, further comprising:
a flag setting section that sets a flag based on the sign of intake air amount data obtained in said subtracting section,
a rotation speed detector detecting a rotation speed of said engine;
a first calculating section that calculates an absolute value of intake air amount data obtained in said subtracting section;
a second calculating section that calculates data of cylinder intake air amount based on the absolute value of intake air amount data obtained in said first calculating section and the engine rotation speed; and
a smoothing section that averages said data of cylinder intake air amount based on calculating equations switched based on said flag.

8. An intake air amount detecting apparatus for an engine according to claim 7, wherein said smoothing section:
has a constitution to weight-average a newest value of said cylinder intake air amount data and a previous weighted mean value;
comprises a calculating equation for weight-averaging said newest value as a negative value and a calculating equation for weight-averaging said newest value as a positive value;
selects the calculating equation for weight-averaging said newest value as the negative value when it is judged based on said flag that the intake air is in the reverse flow; and
selects the calculating equation for weight-averaging said newest value as the positive value when it is judged based on said flag that the intake air is in the forward flow.

9. An intake air amount detecting apparatus for an engine according to claim 1, wherein said intake air amount detector comprises:
a heater disposed in an intake duct;
first and second detection resistors disposed with said heater therebetween;
a bridge circuit formed by connecting said first and second detection resistors and two fixed resistors; and
an output circuit outputting a difference in resistance value between said first and second detection resistors as a potential difference.

10. An intake air amount detecting apparatus for an engine, comprising:
intake air amount detecting means for outputting different detection signals for the forward flow and reverse flow of engine intake air;
conversion means for converting each of the detection signals from said intake air amount detecting means into intake air amount data of same sign;
an offset-amount setting means for setting an offset amount for converting the intake air amount data obtained by said conversion means into intake air amount data with signs that distinguish between the forward flow and the reverse flow; and
subtracting means for subtracting the offset amount set by the offset-amount setting means from the intake air amount data obtained by said conversion means, to obtain intake air amount data in which the forward flow and the reverse flow are distinguished from each other by signs.

11. An intake air amount detecting method for an engine, the method comprising the steps of:
outputting, using an intake air amount detector, different detection signals for forward flow and reverse flow of engine intake air;
converting each of the detections signals from said intake air amount detector into intake air amount data of same sign using a conversion table;
setting an offset amount for converting the intake air amount data obtained in said converting step into intake air amount data in which the forward flow and the reverse flow are distinguished from each other by signs; and
subtracting the offset amount set in said setting step from the intake air amount data of same sign.

12. An intake air amount detecting method for an engine according to claim 11, wherein said step of setting the offset amount comprises the step of:
storing said offset amount in advance as a constant.

13. An intake air amount detecting method for an engine according to claim 11, wherein said step of setting the offset amount comprises the steps of:
storing said detection signal that occurs when the intake air amount is 0;
converting said stored detection signal into intake air amount data using said conversion table; and
setting the intake air amount data obtained by converting the stored detection signal that occurs when the intake air amount is 0 by said conversion table, as said offset amount.

14. An intake air amount detecting method for an engine according to claim 11, further comprising the step of:
averaging the intake air amount data from which said offset amount is subtracted.

15. An intake air amount detecting method for an engine according to claim 11, further comprising the steps of:
setting a flag based on the sign of intake air amount data from which said offset amount is subtracted;
calculating an absolute value of the intake air amount data from which said offset amount is subtracted; and
averaging said absolute value based on calculating equations switched by said flag.

16. An intake air amount detecting method for an engine according to claim 15, wherein said step of averaging comprises the steps of:
storing a calculating equation for weight-averaging a newest value of said intake air amount data as a negative value and a calculating equation for weight-averaging said newest value as a positive value;

judging based on said flag whether the intake air is in the forward flow or in the reverse flow;

selecting the calculating equation for weight-averaging said newest value as the negative value when it is judged that the intake air is in the reverse flow; and selecting the calculating equation for weight-averaging said newest value as the positive value when it is judged that the intake air is in the forward flow.

17. An intake air amount detecting method for an engine according to claim 11, further comprising the steps of:

setting a flag based on the sign of intake air amount data from which said offset amount is subtracted, detecting a rotation speed of said engine;

calculating an absolute value of intake air amount data from which said offset amount is subtracted;

calculating data of cylinder intake air amount based on said absolute value and said engine rotation speed; and averaging said data of cylinder intake air amount based on calculating equations switched based on said flag.

18. An intake air amount detecting method for an engine according to claim 17, wherein said step of averaging comprises the steps of:

storing a calculating equation for weight-averaging said newest value of cylinder intake air amount as a negative value and a calculating equation for weight-averaging said newest value as a positive value;

judging based on said flag whether the intake air is in the forward flow or in the reverse flow;

selecting the calculating equation for weight-averaging said newest value as the negative value when it is judged that the intake air is in the reverse flow; and selecting the calculating equation for weight-averaging said newest value as the positive value when it is judged that the intake air is in the forward flow.

* * * * *